(12) United States Patent
Kim (10) Patent No.: US 8,806,755 B2
(45) Date of Patent: Aug. 19, 2014

(54) METHOD OF MANUFACTURING A PAD SPRING USED IN A VEHICLE DISC BRAKE

(71) Applicant: Doh Hee Kim, Siheung-si (KR)

(72) Inventor: Doh Hee Kim, Siheung-si (KR)

( * ) Notice: Subject to any disclaimer, the term of this patent is extended or adjusted under 35 U.S.C. 154(b) by 0 days.

(21) Appl. No.: 13/950,456

(22) Filed: Jul. 25, 2013

(65) Prior Publication Data

US 2014/0026420 A1   Jan. 30, 2014

(30) Foreign Application Priority Data

Jul. 25, 2012   (KR) .................. 10-2012-0080918

(51) Int. Cl.
*B23P 13/00* (2006.01)

(52) U.S. Cl.
USPC ............................................. 29/896.91

(58) Field of Classification Search
CPC ...... B24B 23/02; B24B 23/028; B24B 55/10; B21F 35/00; F16D 65/0977; F16D 2250/0046

USPC ........................................ 29/896.91
See application file for complete search history.

(56) References Cited

U.S. PATENT DOCUMENTS

2008/0190715 A1 * 8/2008 Kang ........................... 188/73.1
2009/0277729 A1 * 11/2009 Kim ........................... 188/73.38

FOREIGN PATENT DOCUMENTS

| JP | 07073826 B2 | 8/1995 |
| JP | 2649867 B | 5/1997 |
| KR | 1020040090232 A | 10/2004 |
| KR | 1020050080007 A | 8/2005 |
| KR | 1020080044059 A | 5/2008 |

* cited by examiner

*Primary Examiner* — David Bryant
*Assistant Examiner* — Moshe Wilensky
(74) *Attorney, Agent, or Firm* — Novick, Kim & Lee, PLLC; Jae Youn Kim (57) ABSTRACT

Disclosed are a pad spring for disc brakes wherein the surface of the pad spring is roughened through the use of a sanding device using a basket, thereby increasing adhesive force of a coating material coated on the pad spring, and a manufacturing method thereof.

5 Claims, 10 Drawing Sheets

METHOD OF MANUFACTURING A PAD SPRING USED IN A VEHICLE DISC BRAKE

BACKGROUND OF THE INVENTION

1. Field of the Invention

The present invention relates to a pad spring for disc brakes and a manufacturing method thereof and, more particularly, to a pad spring for disc brakes wherein the surface of the pad spring is roughened through the use of a sanding device using a basket, thereby increasing adhesive force of a coating material coated on the pad spring, and a manufacturing method thereof.

2. Description of the Related Art

Generally, a disc brake is a device that forcibly pushes frictional pads to opposite sides of a disc rotated together with each wheel of a vehicle in tight contact to brake and decelerate the vehicle using such frictional force.

The disc brake includes a caliper housing having a piston mounted therein, the piston being advanced and retreated in the caliper housing by braking hydraulic pressure, a carrier fixed to a vehicle body, a pair of pad plates having frictional pads attached to facing insides thereof being installed at the carrier, and a disc disposed such that a portion of the outer circumferential edge of the disc is inserted between the pad plates, the disc rotating together with each wheel.

The piston is disposed at the rear of the caliper housing to push the outside of one pad plate toward the disc. Fingers to surround the outside of the other pad plate are formed at the front part of the caliper housing opposite to the piston.

When the piston is operated such that one pad plate pushes one side of the disc, therefore, the other pad plate pushes the other side of the disc while being led by the fingers with the result that the disc is caught between the frictional pads.

The carrier is fixed to a knuckle of the vehicle body by bolts. The respective pad plates are slidably disposed in the carrier. Between the pad plates and the carrier are provided pad springs to guide sliding of the pad plates and to restrain shaking of the pad plates. Each pad spring is manufactured by pressing and bending a stainless steel sheet or a spring steel sheet.

In the conventional disc brake with the above-stated construction, however, the pad plates, which are made of a metal material, directly contact the pad springs, which are also made of a metal material, during sliding of the pad plates to push the disc with the result that loud noise may be generated or smooth sliding of the pad plates may be disturbed due to friction between the pad plates and the pad springs.

Meanwhile, a method of coating a pad spring for vehicle disc brakes that is capable of coating the inside of the pad spring with Teflon is disclosed in Korean Registered Patent Publication No. 10-668978 (published on Dec. 28, 2005).

In the conventional method of coating the pad spring for vehicle disc brakes, proper coating is not performed with the result that a coated region is poor and has many defects. In addition, coating time is long.

SUMMARY OF THE INVENTION

Therefore, the present invention has been made in view of the above problems, and it is an object of the present invention to provide a pad spring for disc brakes wherein the surface of the pad spring is roughened through the use of a sanding device using a basket, thereby increasing adhesive force of a coating material coated on the pad spring, and a manufacturing method thereof.

Objects of the present invention are not limited to what is mentioned above. Unmentioned other objects of the invention will become apparent to those having ordinary skill in the art from the following description.

In accordance with an aspect of the present invention, the above and other objects can be accomplished by the provision of a manufacturing method of a pad spring used in a vehicle disc brake including a pad spring manufacturing step of pressing a metal sheet to manufacture a pad spring, a pad spring heat treatment step of heat treating the pad spring manufactured at the pad spring manufacturing step, a pad spring sanding step of roughly sanding a surface of the pad spring heat treated at the pad spring heat treatment step, and a pad spring coating step of coating the surface of the pad spring sanded at the pad spring sanding step, wherein the pad spring sanding step includes roughly sanding the surface of the pad spring heat treated at the pad spring heat treatment step through the use of a sanding device using a basket.

The manufacturing method may further include a pad spring washing step of washing the pad spring manufactured at the pad spring manufacturing step before the pad spring heat treatment step is performed.

The sanding device using the basket may include a storage tank to store a sanding material, a basket to receive a plurality of pad springs heat treated at the pad spring heat treatment step, a casing unit to an inside of which the basket is rotatably fixed, and an injection unit to receive the sanding material from the storage tank, to receive compressed air from an external compressed air supply device, and to inject the sanding material and the compressed air into the basket.

The pad spring sanding step may include a pad spring introduction step of introducing a plurality of pad springs into the basket, a basket rotation step of rotating the basket in a state in which the pad springs are received in the basket, and a sanding material and compressed air injection step of injecting the sanding material and the compressed air into the basket through the injection unit at the basket rotation step.

At the pad spring sanding step, the sanding device using the basket may be set to be operated for 15 to 30 minutes per cycle, inclination of the basket may be set to 30 to 40 degrees, air pressure of the compressed air may be set to 2.0 to 6.0 $kgf/cm^2$, and the pad springs may be introduced into the basket at a rate of 100 to 300 EA per cycle.

At the pad spring coating step, Teflon or an elastic material may be coated on a surface of the pad spring or Teflon may be coated on one major surface of the pad spring and the elastic material may be coated on the other major surface of the pad spring.

The manufacturing method may further include a pad spring preheating step of preheating the pad spring before the pad spring coating step is performed, wherein, at the pad spring coating step, Teflon may be sprayed to the pad spring preheated at the pad spring preheating step in a state in which temperature of the pad spring is maintained at a temperature of 30 to 80° C. such that the pad spring is coated with Teflon, the pad spring coated with Teflon may be dried at a temperature of 150 to 170° C. for 5 to 10 minutes, and the dried pad spring may be sintered at a temperature of 280 to 340° C. for 15 to 20 minutes.

In accordance with another aspect of the present invention, there is provided a pad spring for disc brakes manufactured using the manufacturing method as described above.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the accompanying drawings.

Figure 1:
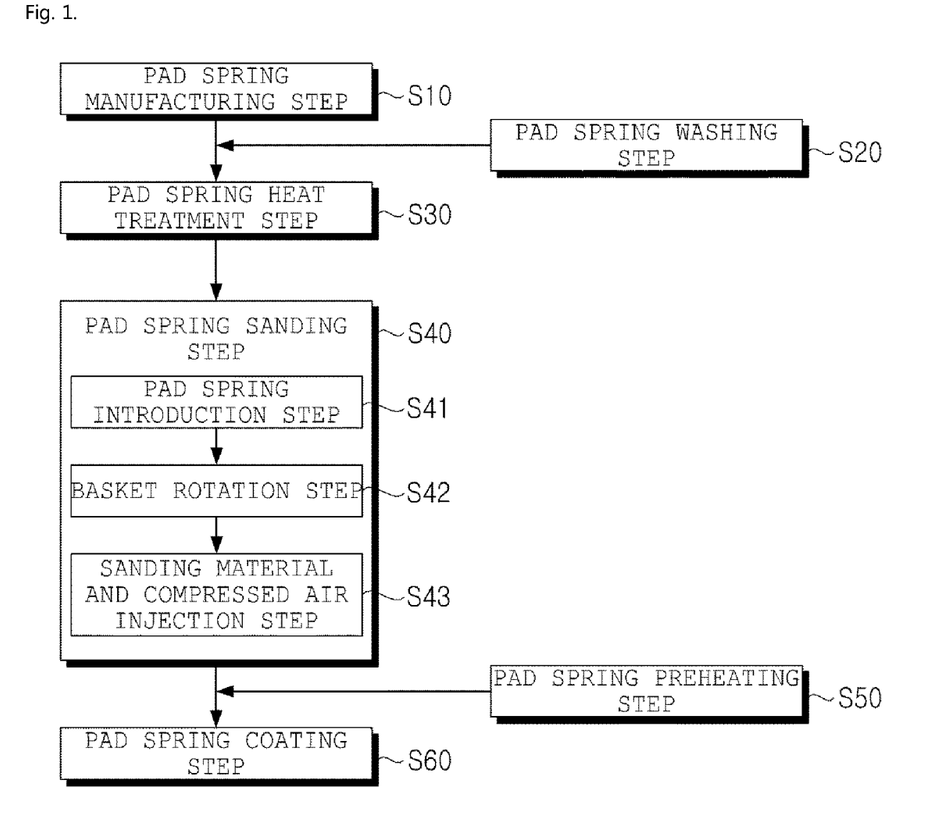
FIG. 1 is a flowchart showing a manufacturing method of a pad spring for disc brakes according to the present invention.
Figure 2:
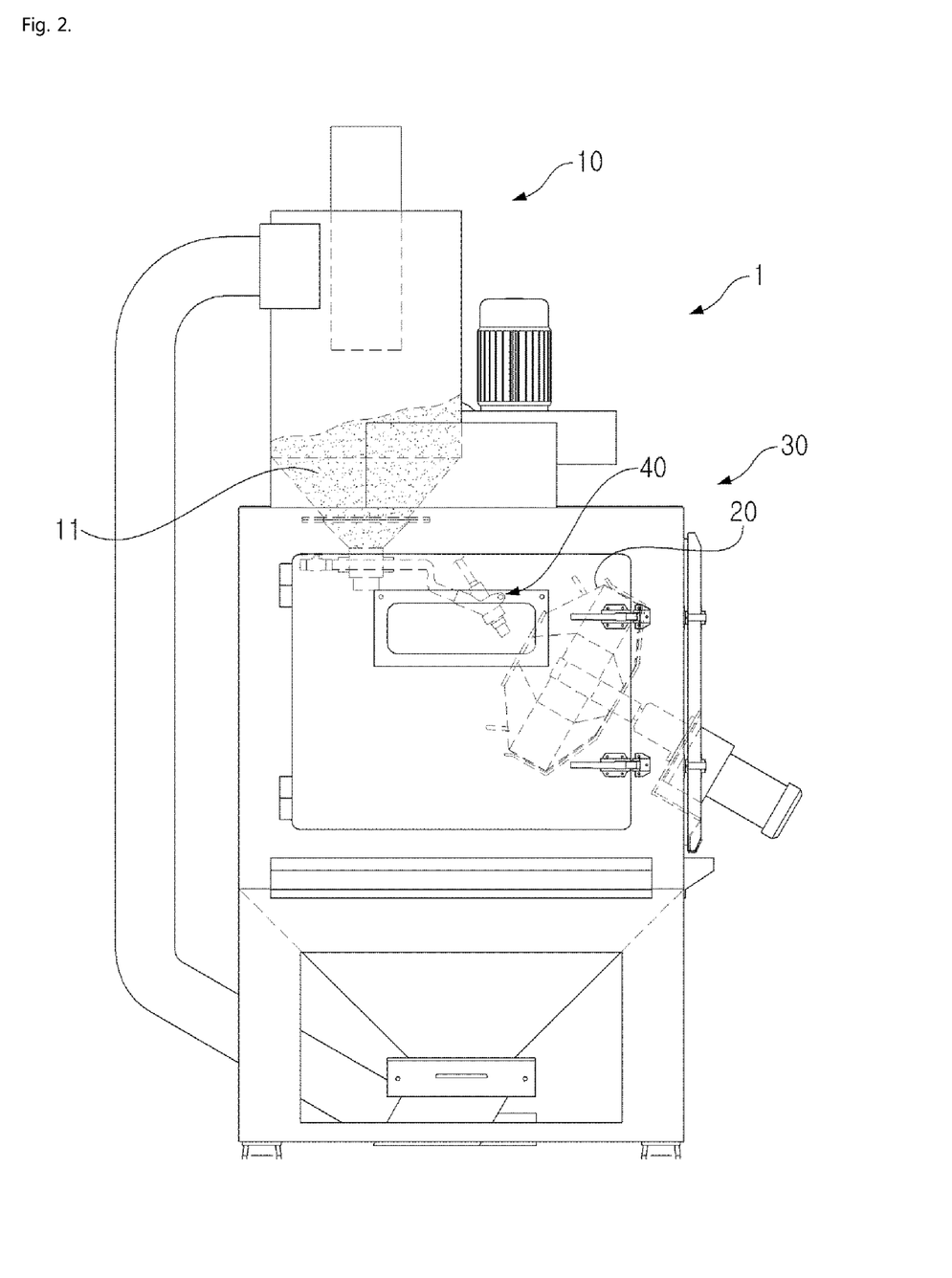
FIGS. 2 and 3 are a front view and a side view showing a sanding device using a basket in the manufacturing method of the pad spring for disc brakes according to the present invention.
Figure 3:
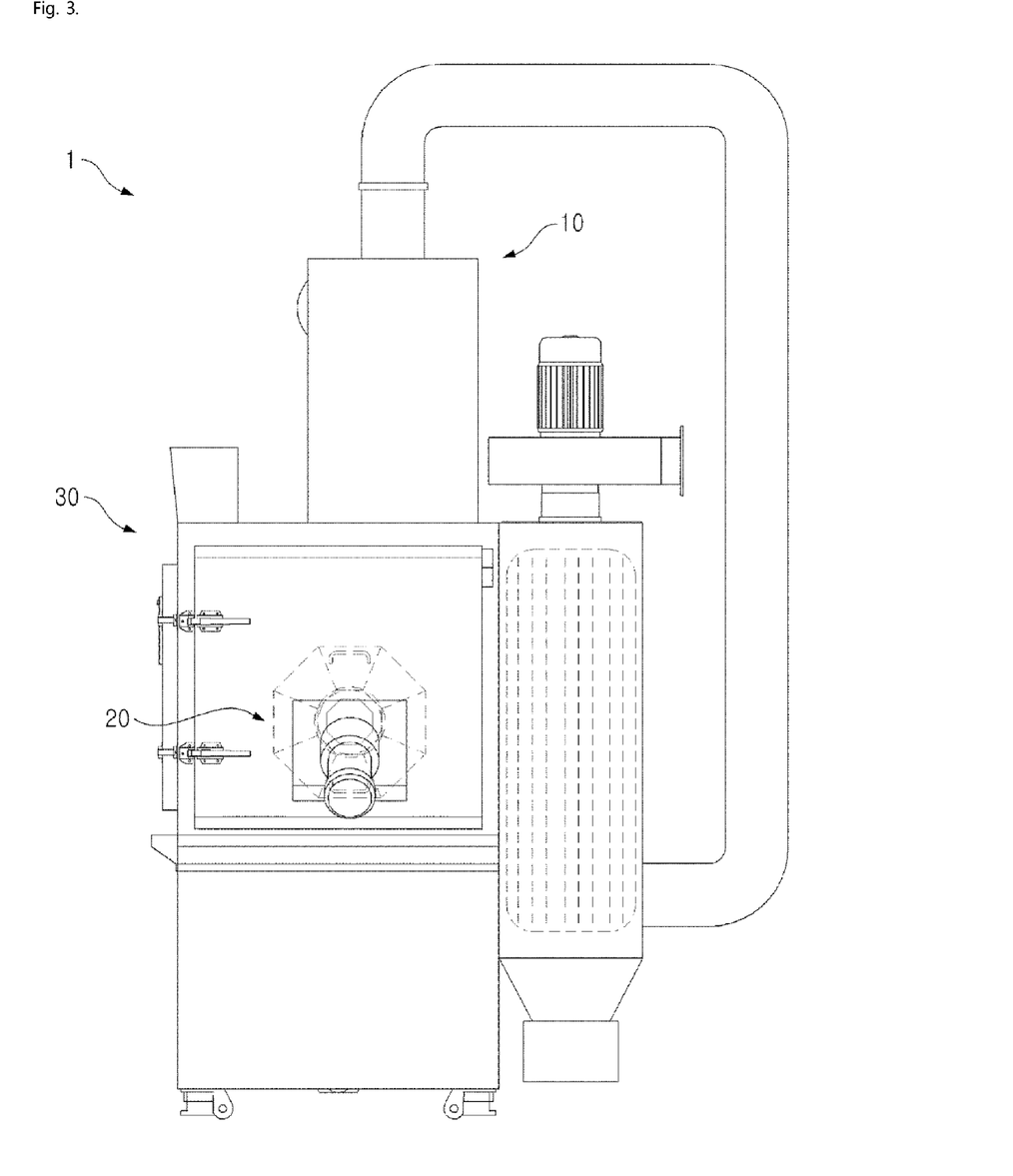
Figure 4:
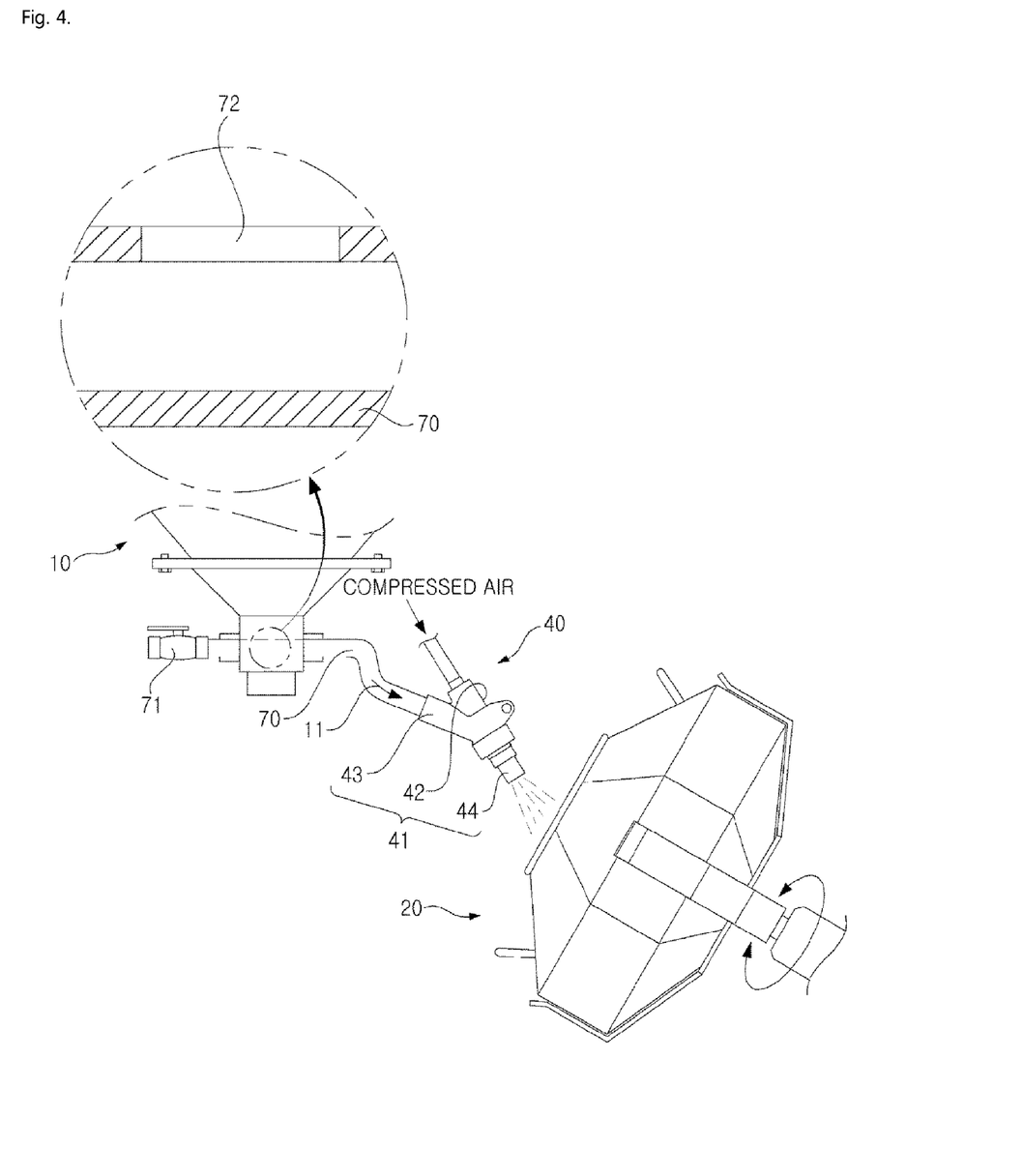
FIG. 4 is a front view showing an injection unit of the sanding device using the basket in the manufacturing method of the pad spring for disc brakes according to the present invention.
Figure 5:
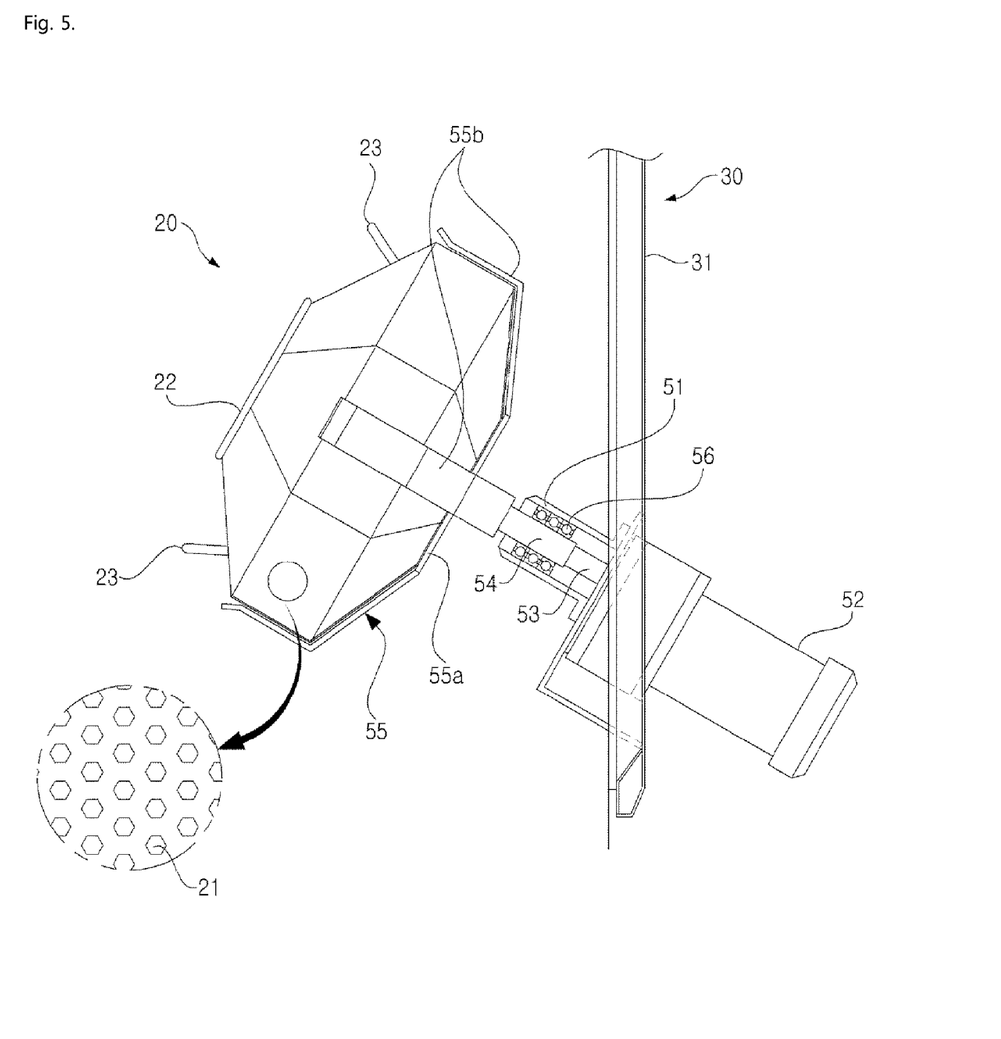
FIG. 5 is a front view showing a fixing unit of the sanding device using the basket in the manufacturing method of the pad spring for disc brakes according to the present invention.
Figure 6:
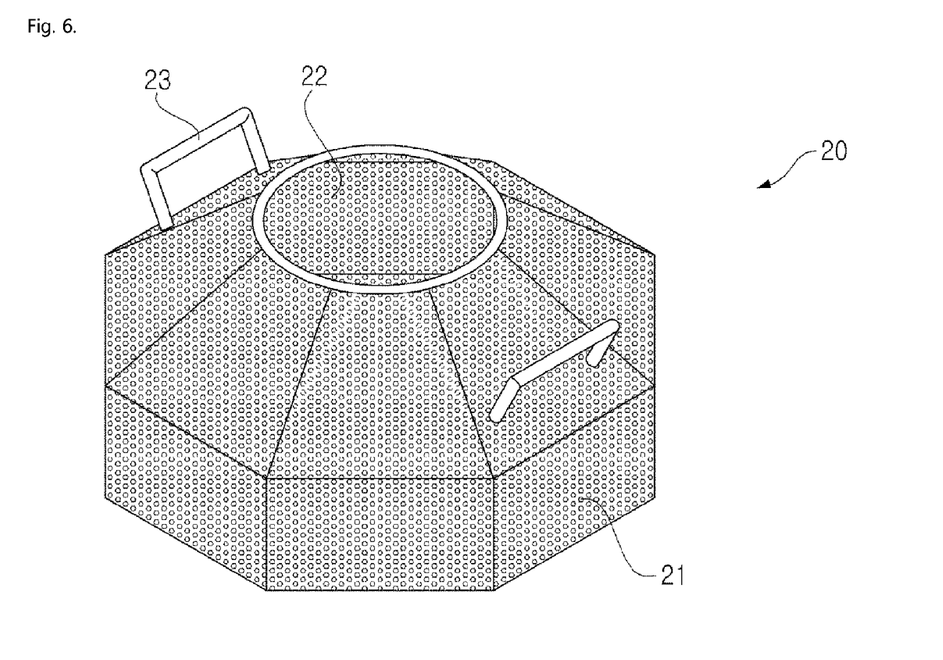
FIGS. 6 and 7 are a perspective view and a bottom perspective view showing the basket of the sanding device using the basket in the manufacturing method of the pad spring for disc brakes according to the present invention.
Figure 7:
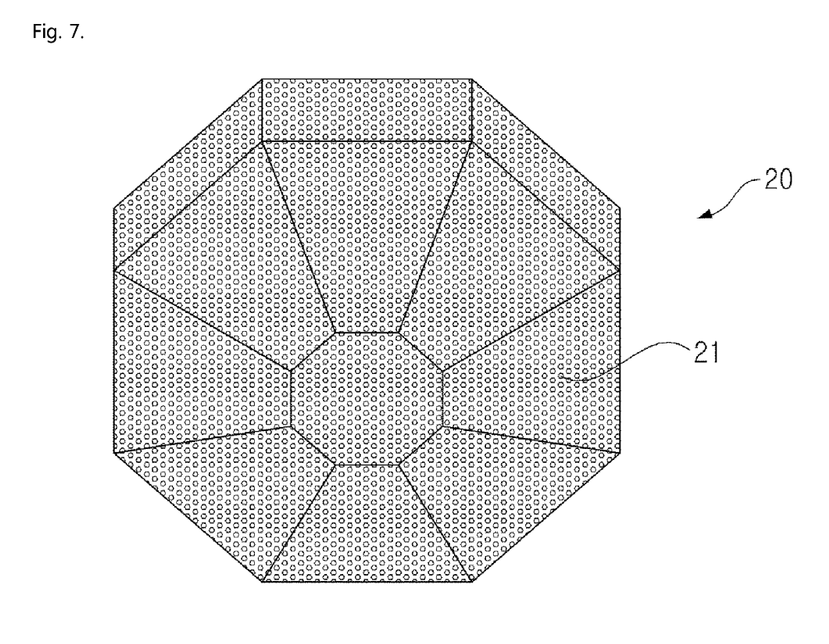
Figure 8:
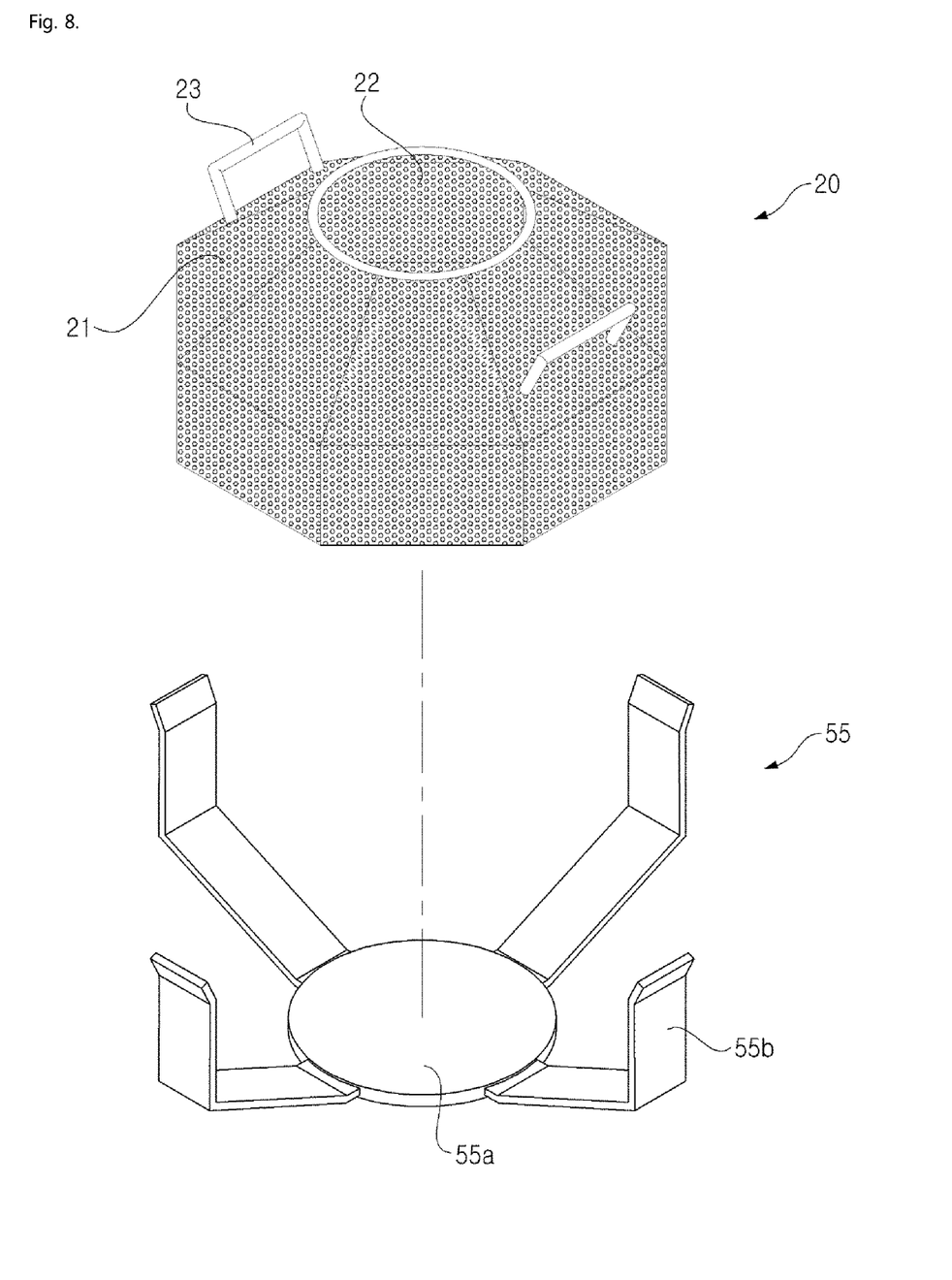
FIG. 8 is an exploded perspective view showing a state in which the basket of the sanding device using the basket is coupled to a mounting frame in the manufacturing method of the pad spring for disc brakes according to the present invention.

FIG. 1 is a flowchart showing a manufacturing method of a pad spring for disc brakes according to the present invention, FIGS. 2 and 3 are a front view and a side view showing a sanding device using a basket in the manufacturing method of the pad spring for disc brakes according to the present invention, FIG. 4 is a front view showing an injection unit of the sanding device using the basket in the manufacturing method of the pad spring for disc brakes according to the present invention, FIG. 5 is a front view showing a fixing unit of the sanding device using the basket in the manufacturing method of the pad spring for disc brakes according to the present invention, FIGS. 6 and 7 are a perspective view and a bottom perspective view showing the basket of the sanding device using the basket in the manufacturing method of the pad spring for disc brakes according to the present invention, and FIG. 8 is an exploded perspective view showing a state in which the basket of the sanding device using the basket is coupled to a mounting frame in the manufacturing method of the pad spring for disc brakes according to the present invention.

Referring to FIGS. 1 to 8, a manufacturing method of a pad spring for disc brakes according to the present invention includes a pad spring manufacturing step (S10) of pressing a metal sheet to manufacture a pad spring 60, a pad spring heat treatment step (S30) of heat treating the pad spring 60 manufactured at the pad spring manufacturing step (S10), a pad spring sanding step (S40) of roughly sanding the surface of the pad spring 60 heat treated at the pad spring heat treatment step (S30), and a pad spring coating step (S60) of coating the surface of the pad spring 60 sanded at the pad spring sanding step (S40).

At the pad spring manufacturing step (S10), any one metal sheet selected from between spring steel and stainless steel having a thickness of 0.4 to 0.6 mm is pressed using a general pressing method or a multi forming method to manufacture the pad spring 60.

The pad spring 60 may be made of various metal materials. In the present invention, however, it is understood that the pad spring 60 is made of stainless steel or spring steel.

At the pad spring manufacturing step (S10), press oil or foreign matter may be attached to the metal sheet during pressing of the metal sheet. Consequently, it is necessary to remove such press oil or foreign matter from the metal sheet.

To this end, the manufacturing method of the pad spring for disc brakes may further include a pad spring washing step (S20) of washing the pad spring 60 manufactured at the pad spring manufacturing step (S10) before the pad spring heat treatment step (S30) is performed.

At the pad spring heat treatment step (S30), the pad spring 60 is heat treated at 340 to 400° C. for 15 to 30 minutes to remove stress generated at a bent portion of the metal sheet during pressing of the metal sheet at the pad spring manufacturing step (S10).

At the pad spring sanding step (S40), the surface of the pad spring 60 heat treated at the pad spring heat treatment step (S30) is roughly sanded through the use of a sanding device 1 using a basket.

The sanding device 1 using the basket includes a storage tank 10 to store a sanding material 11, a basket 20 to receive a plurality of pad springs 60 heat treated at the pad spring heat treatment step (S30), a casing unit 30 to the inside of which the basket 20 is rotatably fixed, and an injection unit 40 to receive the sanding material 11 from the storage tank 10, to receive compressed air from an external compressed air supply device (not shown), and to inject the sanding material 11 and the compressed air into the basket 20. The sanding device 1 using the basket may further include a fixing unit 50 to removably and rotatably fix the basket 20 to the casing unit 30.

As shown in FIG. 4, the sanding device 1 using the basket may further include a supply pipe 70 to supply the sanding material 11 stored in the storage tank 10 to the injection unit 40.

Opposite ends of the supply pipe 70 extend through opposite sides of the lower part of the storage tank 10. An air control valve 71 is provided at one end of the supply pipe 70, an introduction port 72, through which the sanding material 11 is introduced, is formed at the middle part of the supply pipe 70, and the other end of the supply pipe 70 is connected to the injection unit 40.

The sanding material 11 is composed of sand. The sanding material 11 may have a mesh size of 20 to 50. If the mesh size of the sanding material 11 is 100 or more, i.e. particles of the sanding material 11 are fine, it may not be possible to form proper roughness on the surface of the pad spring 60. On the other hand, if the mesh size of the sanding material 11 is 16 to 18, the surface of the pad spring 60 may be too deeply pitted.

As shown in FIG. 4, the injection unit 40 is composed of an injection nozzle 41. The injecting nozzle 41 includes a compressed air introduction part 42, through which compressed air is introduced, a sanding material introduction part 43, through which a sanding material is introduced, and a nozzle part 44 to simultaneously inject the compressed air and the sanding material.

As shown in FIG. 5, the fixing unit 50 includes a support bar 51 opened at opposite ends thereof, one end of the support bar 51 being fixed to the inside of an opening and closing door 31 provided at the casing unit 30 and the other end of the support bar 51 extending upward such that an acute angle is defined between the other end of the support bar 51 and the opening and closing door 31, a drive motor 52 having a rotary shaft 53, the drive motor 52 being located at the outside of the opening and closing door 31, the rotary shaft 53 being inserted into one end of the support bar 51, the drive motor 52 transmitting rotational force to the basket 20, a support rod 54 having one end inserted into the other end of the support bar 51 such that one end of the support rod 54 is connected to the rotary shaft 53 and the other end extending to the outside of the support bar 51, and a mounting frame 55 connected to the other end of the support rod 54, the basket 20 being mounted at the mounting frame 55. A bearding 56 may be provided between the support rod 54 and the support bar 51.

As shown in FIG. 6, the basket 20 is provided at the surface thereof with a plurality of holes 21. One side of the basket 20 is removably coupled to the mounting frame 55. An introduction port 22, through which the pad spring 60 is introduced, is formed at the other side of the basket 20.

Handles 23 may be installed at the outside of the basket 20. A sanding worker may separate the basket 20 from the mounting frame 55 or couple the basket 20 to the mounting frame 55 while holding the handles 23.

Between one side and the other side of the basket 20, three facets formed approximately in a bracket shape are radially disposed toward the center of the basket 30. That is, as shown in FIG. 7, the basket 20 is formed in the shape of an octahedron when viewed from the bottom.

In the sanding device 1 using the basket, the basket is rotated at an angle of 30 to 45 degrees. Consequently, the sanding material 11 may be naturally injected from the injection unit 40 into the basket 20.

In a case in which the basket 20 is rotated at a predetermined angle as described above, a larger amount of pad springs 60 may be received in the basket 20 than in a case in which the basket 20 is rotated vertically. In addition, the pad springs 60 may be more securely prevented from escaping from the basket 20 through the introduction port 22.

The sanding material 11 injected to the pad springs 60 received in the basket 20 may be discharged from the basket 20 through the holes 21.

The mounting frame 55 may be configured such that the basket 20 is fitted into the mounting frame 55 in a state in which the basket 20 minimally contacts the mounting frame 55.

As shown in FIG. 8, the mounting frame 55 includes a plate 55a on which one side surface of the basket 20 is located and a plurality of mounting ribs 55b, each of which has one end connected to the plate 55a and the other end bent along the surface thereof from one side to the other side of the basket 20 to surround the basket 20.

The pad spring sanding step (S40) includes a pad spring introduction step (S41) of introducing a plurality of pad springs 60 into the basket 20, a basket rotation step (S42) of rotating the basket 20 in a state in which the pad springs 60 are received in the basket 20, and a sanding material and compressed air injection step (S43) of injecting the sanding material 11 and the compressed air into the basket 20 through the injection unit 40 at the basket rotation step (S42).

At the pad spring sanding step (S40), the sanding device 1 using the basket is set to be operated for 15 to 30 minutes per cycle, inclination of the basket 20 is set to 30 to 40 degrees, air pressure of the compressed air is set to 2.0 to 6.0 kgf/cm², and the pad springs 60 are introduced into the basket 20 at a rate of 100 to 300 EA per cycle such that surfaces of the pad springs 60 are roughly sanded.

As positions of the pad springs 60 are changed by rotation of the basket 20 at the pad spring sanding step (S40), the entire surfaces of the pad springs 60 may be sanded by the sanding material 11 injected through the injection unit 40 at high pressure.

At the pad spring coating step (S60), Teflon is sprayed onto the pad springs 60 in a state in which temperature of the pad springs is maintained at a temperature of 30 to 80° C. such that the pad springs 60 are coated with Teflon, the pad springs 60 coated with Teflon are dried at a temperature of 150 to 170° C. for 5 to 10 minutes, and the dried pad springs 60 are sintered at a temperature of 280 to 340° C. for 15 to 20 minutes.

To this end, the manufacturing method of the pad spring for disc brakes may further include a pad spring preheating step (S50) of preheating the pad springs 60 to a temperature of 30 to 80° C. before the pad spring coating step (S60) is performed.

At the pad spring coating step (S60), 2 to 8 kg of Teflon may be sprayed onto the pad springs 60 using a spray gun. The coating thickness of each pad spring 60 may be 10 to 45 μm. After coating, the pad springs 60 may be dried.

After the pad spring coating step (S60) is performed, it is necessary to prevent foreign matter from being attached to the finished pad springs 60. To this end, the finished pad springs 60 may be arranged in a tray using clean gloves.

In the manufacturing method of the pad spring for disc brakes according to the present invention, the pad springs 60 may be coated using a manual coating method, an automatic coating method, an electrostatic coating method, or a bell type coating method. In addition, the nozzle may have a diameter of 0.8 to 1.5 mm.

Teflon is composed of polyamide imide polymer, tetrafluoroethylene resin, melamine resin, formaldehyde, N-butyl alcohol, methyl isobutyl ketone, VM&P Naphtha, methyl pyrrolidone, and carbon black.

It is necessary for Teflon to be sufficiently rolled before use and to be uniformly stirred such that dissolved solids of Teflon become sufficiently untied and thus do not form lumps.

In a case in which a continuous type furnace is used to sinter the pad springs 60, the pad springs 60 may be sintered at 400 to 600 rpm for 15 to 20 minutes. At this time, it is necessary for temperature deviation to be within 10° C.

Figure 9:
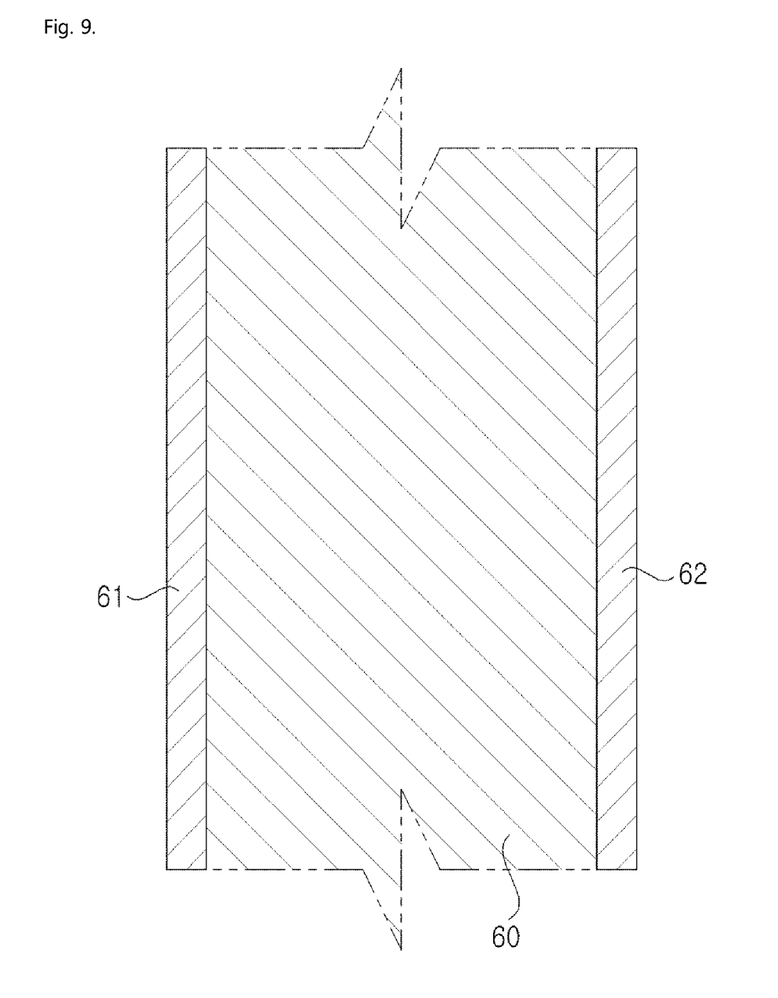
FIG. 9 is a partial sectional view showing a pad spring manufactured by the manufacturing method of the pad spring for disc brakes according to the present invention.
Figure 10:
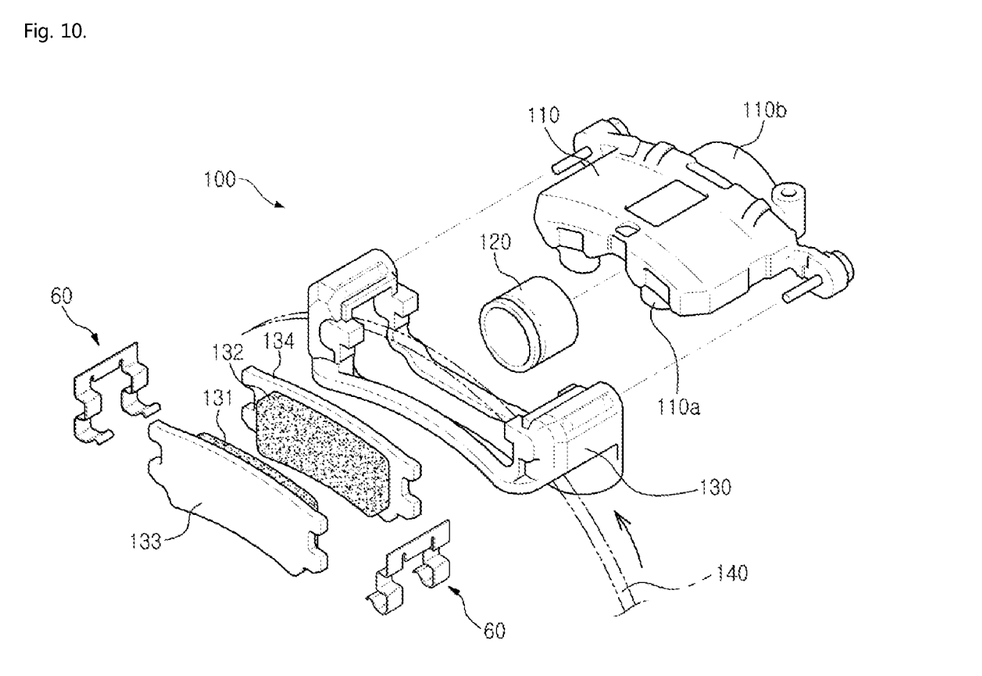
FIG. 10 is a view showing a state in which the pad spring manufactured by the manufacturing method of the pad spring for disc brakes according to the present invention is used.

FIG. 9 is a partial sectional view showing a pad spring manufactured by the manufacturing method of the pad spring for disc brakes according to the present invention and FIG. 10 is a view showing a state in which the pad spring manufactured by the manufacturing method of the pad spring for disc brakes according to the present invention is used.

Referring to FIGS. 9 and 10, Teflon 61 may be coated on one major surface of the pad spring 60 and an elastic material 62 may be coated on the other major surface of the pad spring 60 at the pad spring coating step (S60).

The elastic material 62 may be composed of heat resistant reinforced rubber and urethane. The heat-resistant reinforced rubber may have a thickness of 10 to 45 μm.

A disc brake 100 includes a caliper housing 110 having a piston 120 mounted therein, the piston 120 being advanced and retreated in the caliper housing 110 by braking hydraulic pressure, a carrier 130 fixed to a vehicle body, a pair of pad plates 133 and 134 having frictional pads 131 and 132 attached to facing insides thereof being installed at the carrier 130, and a disc 140 disposed such that a portion of the outer circumferential edge of the disc 140 is inserted between the pad plates 133 and 134, the disc 140 rotating together with each wheel.

The piston 120 is disposed at the rear of the caliper housing 110 to push the outside of the pad plate 134 toward the disc

140. Fingers 110*a* to surround the outside of the pad plate 133 are formed at the front part of the caliper housing 110 opposite to the piston 120. The caliper housing 110 is slidably coupled to the carrier 130. For reference, unexplained reference numeral 110*b* indicates a cylinder to receive the piston 120.

When the piston 120 is operated such that the pad plate 134 pushes one side of the disc 140, therefore, the pad plate 133 pushes the other side of the disc 140 while being led by the fingers 110*a* with the result that the disc 140 is caught between the frictional pads 131 and 132.

Meanwhile, the carrier 130 is fixed to a knuckle of the vehicle body by bolts. The pad plates 133 and 134 are slidably disposed in the carrier 130. Between the pad plates 133 and 134 and the carrier 130 are provided pad springs 60 to guide sliding of the pad plates 133 and 134 and to restrain shaking of the pad plates 133 and 134.

Each pad spring 60 is configured such that one major surface of each pad spring 60 contacting the pad plates 133 and 134 is coated with Teflon 61 and the other major surface of each pad spring 60 contacting the carrier 130 is coated with an elastic material 62. As a result, a function of the pad springs 60 to smoothly guide sliding of the pad plates 133 and 134 and a function of the pad springs 60 to reduce vibration applied from the pad plates 133 and 134 to the carrier 130 are simultaneously improved. Furthermore, such an improved friction reduction function and a shock absorption function of the pad springs 60 are maintained for a long period of time.

In a case in which the pad plates 133 and 134, which are made of a metal material, directly contact the pad springs 60, which are also made of a metal material, during sliding of the pad plates 133 and 134 to push the disc 140, smooth sliding of the pad plates 133 and 134 may be disturbed while loud noise is generated due to friction between the pad plates 133 and 134 and the pad springs 60. According to the present invention, however, one major surface of each pad spring 60 contacting the pad plates 133 and 134 is coated with Teflon 61 with the result that contact friction between the pad plates 133 and 134 and the pad springs 60 is reduced, thereby achieving more smooth sliding of the pad plates 133 and 134.

Furthermore, even when Teflon 61 is used for more than a predetermined period of time, it is not necessary to replace the Teflon 61. In addition, even when abraded dust particles are generated during friction between the disc 140 and the frictional pads 131 and 132, the abraded dust particles are naturally removed by wind generated during running of a vehicle with the result that smooth sliding of the pad plates 133 and 134 are maintained for a longer period of time.

Moreover, the pad springs 60 elastically support the pad plates 133 and 134 and the carrier 130. During sliding of the pad plates 133 and 134, the pad springs 60 absorb vibration generated as the pad plates 133 and 134 shake in a direction perpendicular to the sliding direction to prevent the vibration from being transferred to the vehicle body via the carrier 130. Since the pad springs 60 are made of stainless steel or spring steel, an elastic deformation and restoration ability of the pad springs 60 may be reduced over time in terms of characteristics of stainless steel or spring steel with the result that a damping function of the pad springs 60 may be deteriorated.

According to the present invention, however, the other side of each pad spring 60 contacting the carrier 130 is coated with the elastic material 62 with the result that elastic force of the pad springs 60 is doubled due to elastic force of the elastic material 62. Consequently, a damping function of the pad springs 60 is improved. Even in a case in which the elastic force of the pad springs 60 is reduced after the pad springs 60 are used for a long period of time, the pad springs 60 may continuously perform a fundamental damping action due to the elastic force of the elastic material 62.

Teflon 61 and the elastic material 62 may be coated on a portion of each pad spring 60. Alternatively, Teflon 61 and the elastic material 62 may be entirely coated over opposite major surfaces of each pad spring 60.

As is apparent from the above description, the surface of the pad spring is roughened through the use of the sanding device using the basket according to the present invention. Consequently, the present invention has the effect of increasing adhesive force of a coating material coated on the pad spring.

Effects of the present invention are not limited to what is mentioned above. Other unmentioned effects of the invention will be apparent to those having ordinary skill in the art from the above description.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A manufacturing method of a pad spring used in a vehicle disc brake, the method comprising:
    a pad spring manufacturing step of pressing a metal sheet to manufacture a pad spring;
    a pad spring heat treatment step of heat treating the pad spring manufactured at the pad spring manufacturing step;
    a pad spring sanding step of sanding a surface of the pad spring heat treated at the pad spring heat treatment step; and
    a pad spring coating step of coating the surface of the pad spring sanded at the pad spring sanding step,
    wherein the pad spring sanding step comprises sanding the surface of the pad spring heat treated at the pad spring heat treatment step through the use of a sanding device
    wherein the sanding device comprises:
        a storage tank to store a sanding material;
        a basket to receive a plurality of pad springs heat treated at the pad spring heat treatment step;
        a casing unit to an inside of which the basket is rotatably fixed, the casing unit having an opening and closing door;
        a fixing unit to removably and rotatably fix the basket to the opening and closing door;
        an injection unit to receive the sanding material from the storage tank, to receive compressed air from an external compressed air supply device, and to inject the sanding material and the compressed air into the basket; and
        a supply pipe to supply the sanding material stored in the storage tank to the injection unit, the supply pipe being configured such that opposite ends of the supply pipe extend through opposite sides of a lower part of the storage tank, wherein an air control valve is provided at one end of the supply pipe, an introduction port, through which the sanding material is introduced, is formed at a middle part of the supply pipe, and the other end of the supply pipe is connected to the injection unit, and
    wherein the pad spring sanding step further comprises:
        operating the sanding device in cycles of 15 to 30 minutes per cycle; and
        introducing 100 to 300 pad springs into the basket each cycle.

2. The manufacturing method according to claim 1, further comprising a pad spring washing step of washing the pad spring manufactured at the pad spring manufacturing step before the pad spring heat treatment step is performed.

3. The manufacturing method according to claim 1, wherein the pad spring sanding step comprises:
- a pad spring introduction step of introducing the plurality of pad springs into the basket;
- a basket rotation step of rotating the basket; and
- a sanding material and compressed air injection step of injecting the sanding material and the compressed air into the basket through the injection unit at the basket rotation step.

4. The manufacturing method according to claim 1, wherein, at the pad spring coating step,
- Teflon or an elastic material is coated on a surface of the pad spring, or
- Teflon is coated on one major surface of the pad spring and the elastic material is coated on the other major surface of the pad spring.

5. The manufacturing method according to claim 1, further comprising:
- a pad spring preheating step of preheating the pad spring before the pad spring coating step is performed, wherein
- at the pad spring coating step, Teflon is sprayed to the pad spring preheated at the pad spring preheating step in a state in which temperature of the pad spring is maintained at a temperature of 30 to 80° C. such that the pad spring is coated with Teflon, the pad spring coated with Teflon are dried at a temperature of 150 to 170° C. for 5 to 10 minutes, and the dried pad spring is sintered at a temperature of 280 to 340° C. for 15 to 20 minutes.

\* \* \* \* \*